United States Patent [19]
Liao

[11] Patent Number: 6,120,106
[45] Date of Patent: Sep. 19, 2000

[54] WHEEL SUPPORTER AND SHAFT FOR A GOLF CART

[75] Inventor: Gordon Liao, Yung Kang, Taiwan

[73] Assignee: Unique Product & Design Co., Ltd., Tainan Hsien, Taiwan

[21] Appl. No.: 09/181,060

[22] Filed: Oct. 27, 1998

[51] Int. Cl.[7] .................................................. B60B 23/00
[52] U.S. Cl. ...................... 301/111; 301/120; 403/322.4
[58] Field of Search .................. 301/111, 112, 301/113, 118–122, 124.1, 126, 131; 280/DIG. 6, DIG. 4, 642, 645–647, 652, 654; 403/315, 316, 319, 321–325

[56] References Cited

U.S. PATENT DOCUMENTS

| | | | |
|---|---|---|---|
| 4,805,941 | 2/1989 | Downing et al. | 301/113 |
| 4,913,610 | 4/1990 | Olivieri | 301/120 |
| 4,936,598 | 6/1990 | Lee | 280/645 |
| 4,978,175 | 12/1990 | Wu | 301/121 |
| 5,029,946 | 7/1991 | Liao | 301/111 |
| 5,215,356 | 6/1993 | Lin | 301/111 |
| 5,277,480 | 1/1994 | Chiu | 301/111 |
| 5,466,051 | 11/1995 | Liao | 301/112 |
| 5,507,566 | 4/1996 | Chen | 403/325 |
| 5,529,385 | 6/1996 | Tsao | 403/321 |
| 5,658,054 | 8/1997 | Wu | 301/111 |
| 5,716,107 | 2/1998 | Parket et al. | 301/111 |
| 5,765,857 | 6/1998 | Hsiao | 280/DIG. 6 |
| 5,800,022 | 9/1998 | Del Rosario | 305/118 |
| 5,902,018 | 5/1999 | Owen et al. | 301/111 |
| 5,938,294 | 8/1999 | Chan | 301/111 |
| 5,988,928 | 11/1999 | Cheng | 403/325 |
| 6,003,956 | 12/1999 | Wu | 301/111 |

*Primary Examiner*—S. Joseph Morano
*Assistant Examiner*—Long Bao Nguyen
*Attorney, Agent, or Firm*—Pro-Techtor International Services

[57] ABSTRACT

A wheel supporter and shaft for a golf cart includes a wheel shaft having an end portion protruding out of a wheel. The protruding end portion is formed with two opposite recesses respectively provided with a curved projection. The wheel supporter has a shaft hole for the wheel shaft to fit therein, and an eccentric push-member is pivotally connected under a bottom wall of the shaft hole. The eccentric push member has two round projections to protrude in the shaft hole to engage a space between each recess and each curved projection so that the wheel supporter may be locked with the wheel shaft in a stabilized condition with easy handling.

4 Claims, 10 Drawing Sheets

WHEEL SUPPORTER AND SHAFT FOR A GOLF CART

BACKGROUND OF THE INVENTION

This invention relates to a wheel supporter and a shaft for a golf cart, particularly to one having a simple structure for easy assemblage and collapsing.

Conventional golf carts are generally made collapsible, with a wheel supporter and shaft capable to be collapsed and assembled by a user, so as to be easily carried with a small dimensions or stored in a car trunk after collapsed.

Nowadays, there are two kinds of conventional wheel supporters and shafts for a golf cart.

A first kind of conventional wheel supporter and shaft is shown in FIGS. 1 and 2, including a wheel supporter 1 consisting of a metal plate unit 11. The metal plate unit 11 has a pin 5 to pivotally connect a recover spring 4 and a push member 3, a shaft hole 111 for a shaft 21 of a wheel 2 to insert therein. The Push member 3 has a projecting pointed member 31 in an intermediate portion, a groove 32 under the pointed member 31, and an engage plate portion 33 formed in an upper portion. The recover spring 4 has one end hooked on the metal plate unit 11, and the other end hooked at a middle point of the push member 3, controlling engagement and disengagement of the groove 32 of the push member 3 and an annular groove 211 of the shaft 21.

This conventional wheel supporter and shaft is convenient in handling, but its structure is a little complicated for assembly or collapsing.

The second kind of conventional wheel supporter and shaft is shown in FIGS. 3 and 4, including a wheel supporter 1, which has a rectangular opening 11 and an insert hole 12, a coil spring 13 contained in the opening 11, and an engage block 3 elastically urged by the coil spring 13 and normally located in the opening 11 to able to be half pushed out of the opening 11. The engage block 3 has a protruding hook 31 in a left longitudinal side of an outer block portion engaging an inner wall of the opening 11, and an L-shaped position hook 32 with a sloped surface extending inward from the outer block portion. A wheel shaft 20 has one end firmly connected to a wheel 2 and the other end portion 21 formed with a distal square end 23 facing the sloped surface of the L-shaped position hook 32 of the engage block 3 located in the wheel supporter 1, and an intermediate groove portion 22 to engage the L-shaped position hook 32.

In handling the second conventional wheel supporter and shaft, the wheel shaft 20 is inserted in the insert hole 12 of the wheel supporter 1, with the other end portion of the wheel shaft 20 engaging the L-shaped position hook 32 of the engage block 3, finishing assemblage of the wheel supporter 1 with the wheel shaft 20. On the contrary, if the wheel shaft 20 is to be pulled out of the wheel supporter 1, the push block 3 is pushed up (in FIG. 4, or inward) to compress the coil spring 13, forcing the L-shaped position hook 32 disengage from the other end portion 21 of the wheel shaft 20 to free the wheel shaft 20 from the wheel supporter 1.

However, the second conventional wheel supporter and shaft is also handy to handle, but its structure is also complicated for assembly and collapsing.

SUMMARY OF THE INVENTION

The purpose of the invention is to offer a wheel supporter and shaft for a golf cart, having a simpler structure than the conventional ones for easy assemblage and collapsing.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
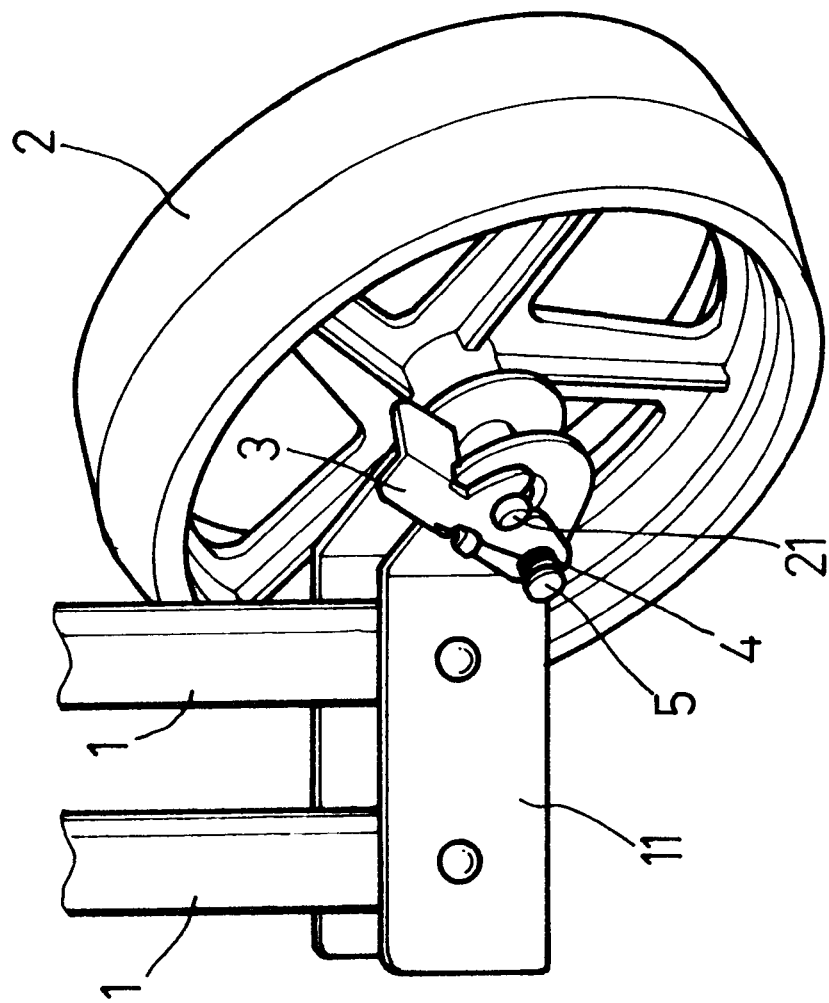
FIG. 1 is a perspective view of a first conventional wheel supporter and shaft for a golf cart.
Figure 2:
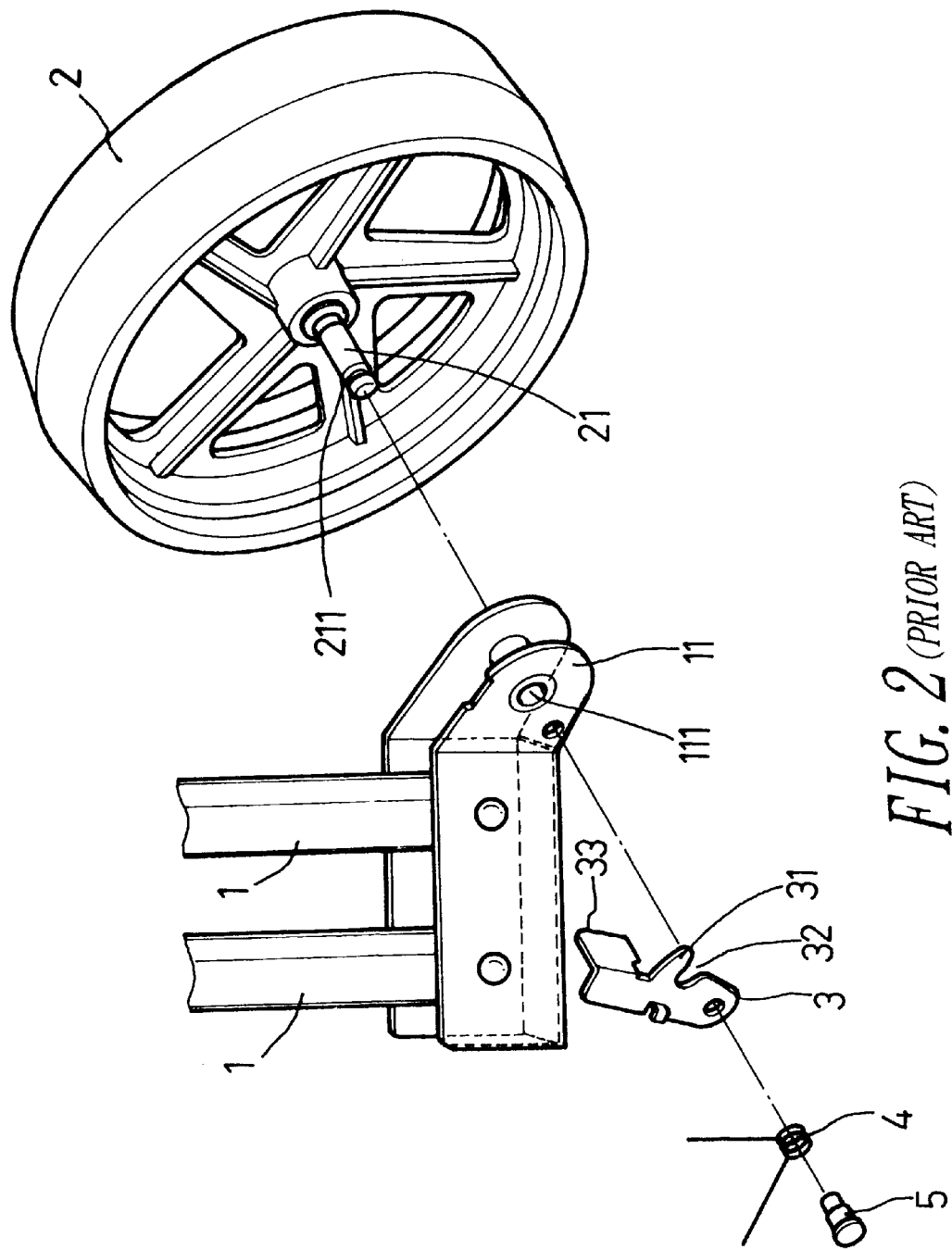
FIG. 2 is an exploded perspective view of the first conventional wheel supporter and shaft for a golf cart.
Figure 3:
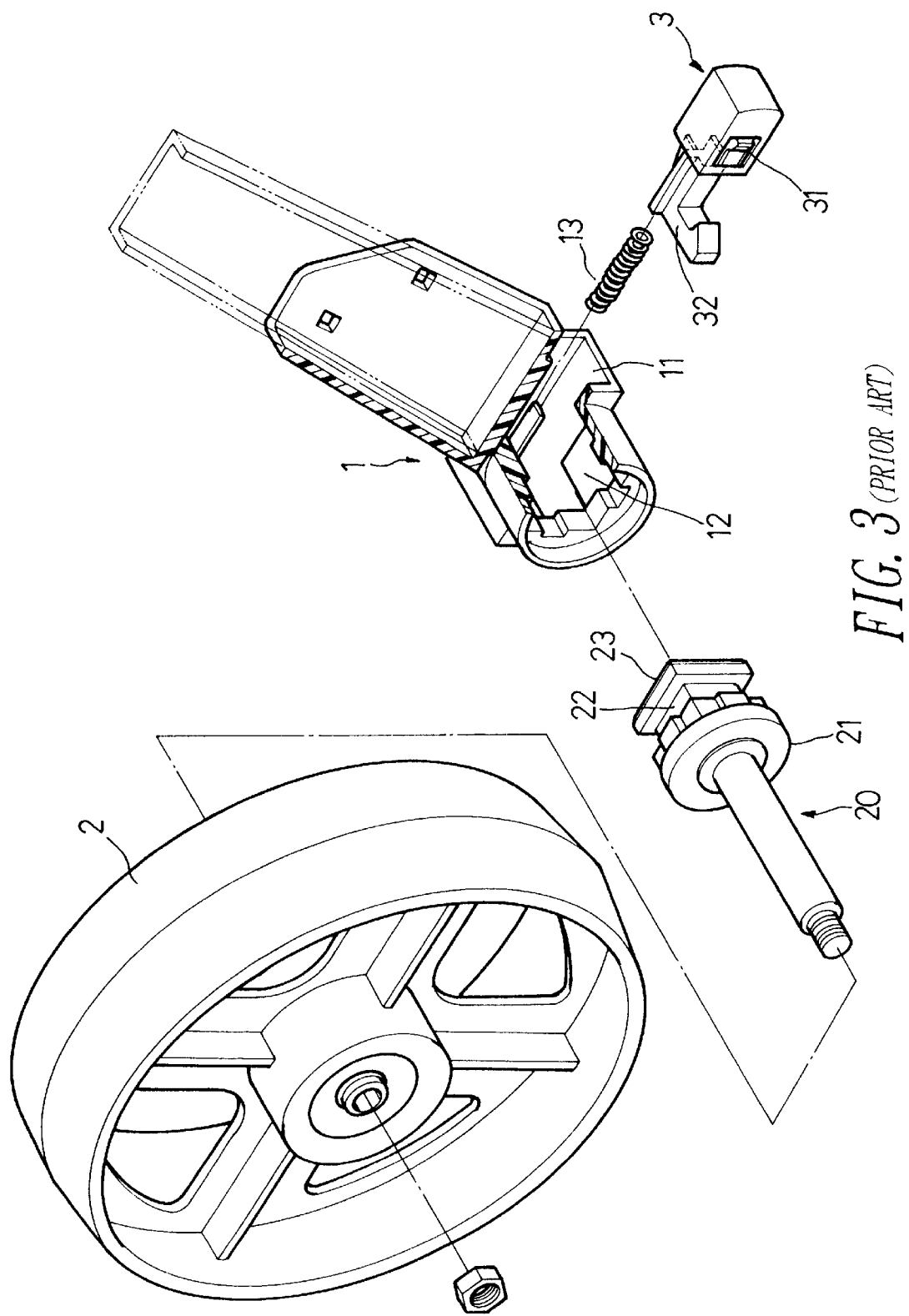
FIG. 3 is an exploded perspective view of a second conventional wheel supporter and shaft for a golf cart.
Figure 4:
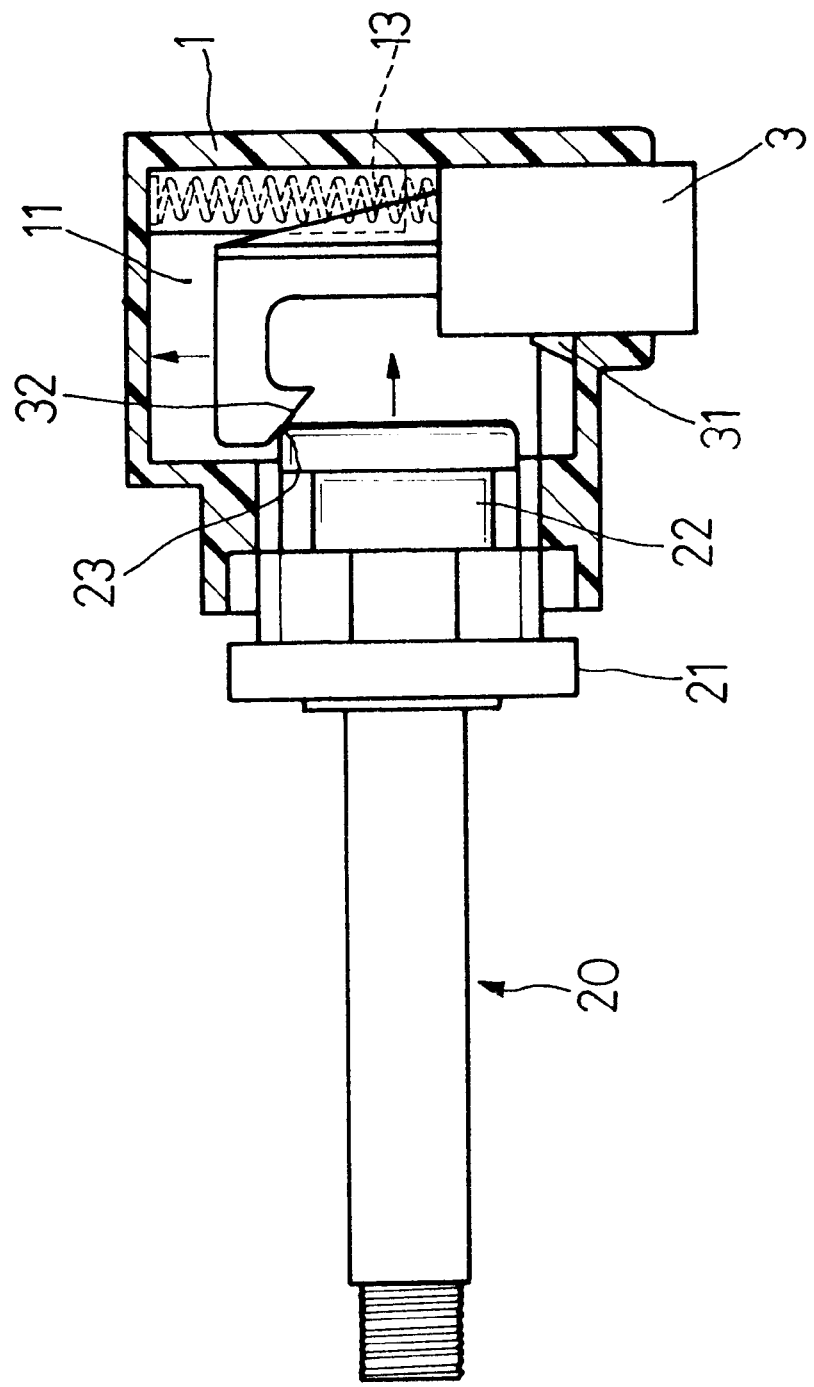
FIG. 4 is a side cross-sectional view of the second conventional wheel supporter and shaft for a golf cart, showing the wheel shaft disengaged from the wheel supporter.
Figure 5:
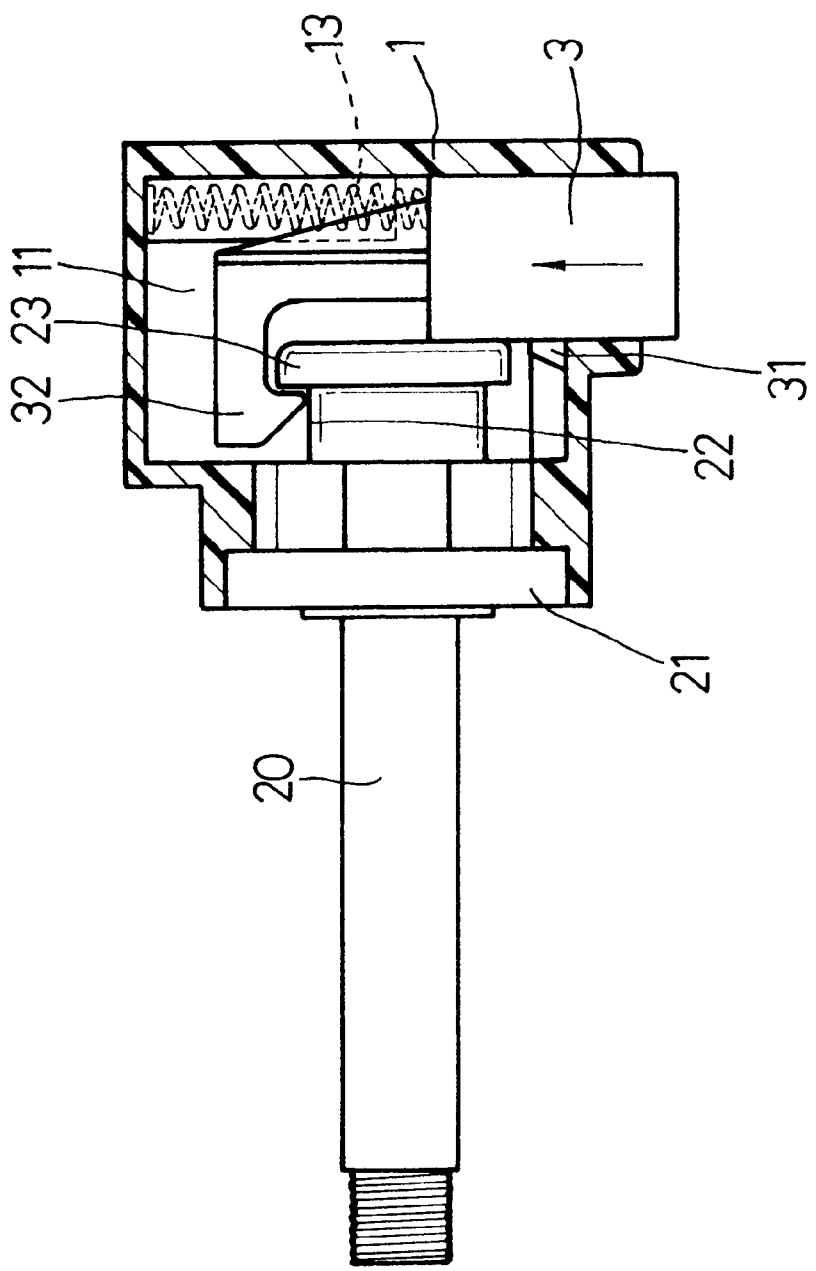
FIG. 5 is a side cross-sectional view of the second conventional wheel supporter and shaft for a golf cart, showing the wheel shaft engaged with the wheel supporter.
Figure 6:
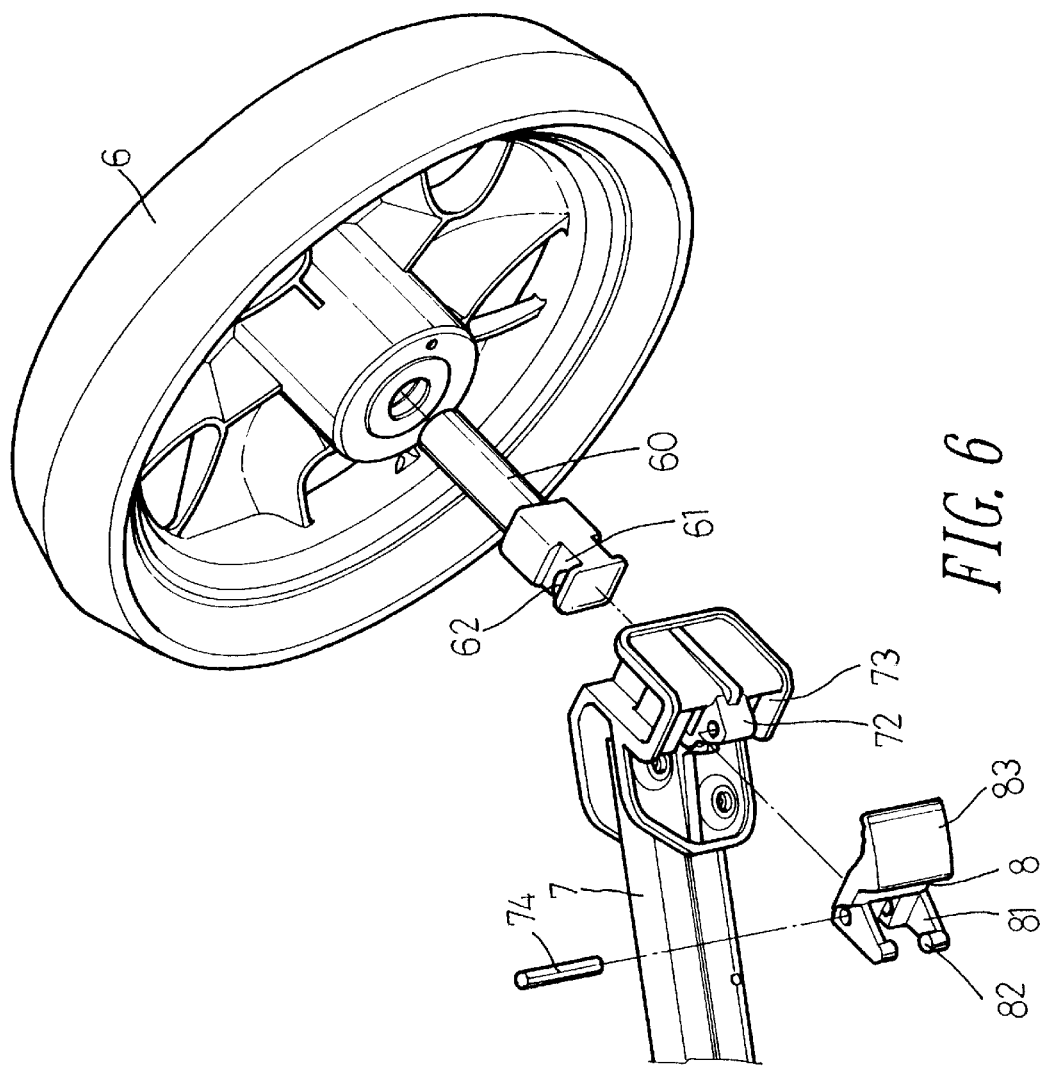
FIG. 6 is an exploded perspective view of a wheel supporter and shaft for a golf cart in the present invention.
Figure 7:
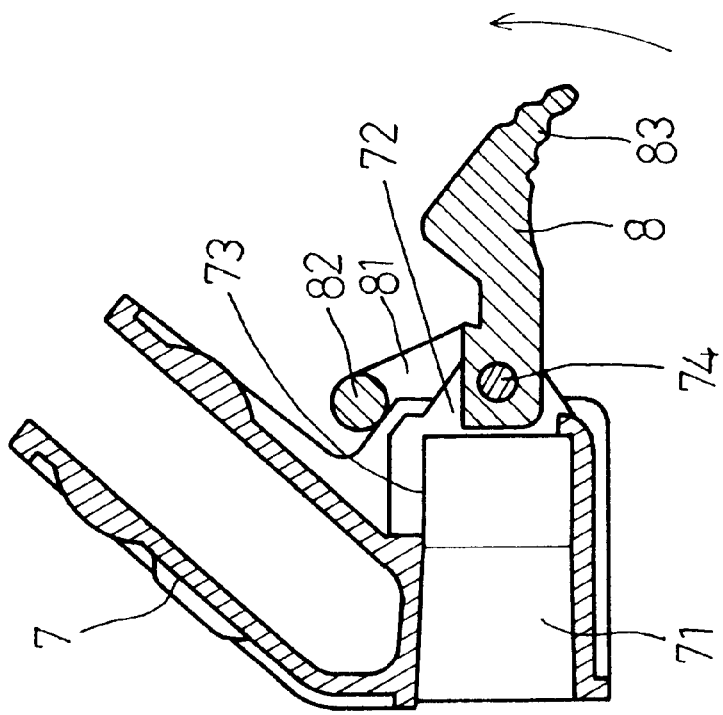
FIG. 7 is a cross-sectional view of the wheel supporter disengaged from the wheel shaft in the present invention.
Figure 7:
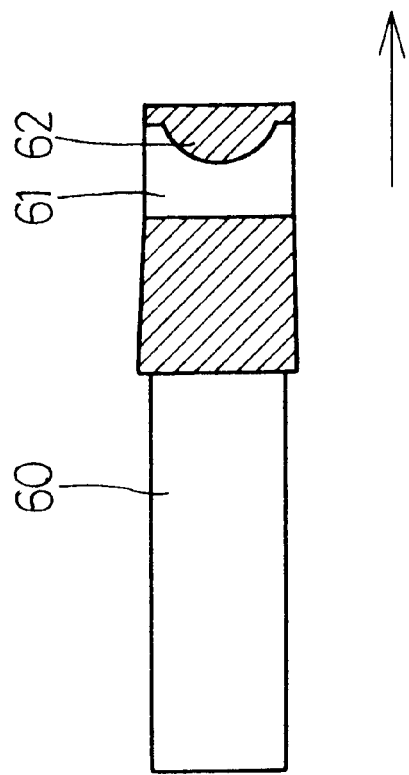

A preferred embodiment of a wheel supporter and shaft for a golf cart in the present invention, as shown in FIGS. 6 and 7, includes a wheel, shaft 6 having a round end to fix firmly with a wheel 6 and the other end protruding out of a wheel 6 and shaped rectangular and having two opposite recesses 6 of smaller size than the rest portion and a curved projection 62 formed in each recess 11. A wheel supporter 7 has a rectangular shaft hole 71 formed in a lower end for the wheel shaft 60 to fit therein, a pivotal base 72 formed in a bottom wall defining the shaft hole 71, a groove 73 formed respectively at two sides of the pivotal base 72 for pivotally connecting an eccentric push member 8 with a pin shaft 74. The eccentric Push member 8 has two projecting ears 81 formed in an upper portion, and a round projection 82 respectively formed on an inner side of each ear 81 to pass through the grooves 73 and extend in the shaft hole 71, and a curved push means 83 formed in the other end portion.

Figure 8:
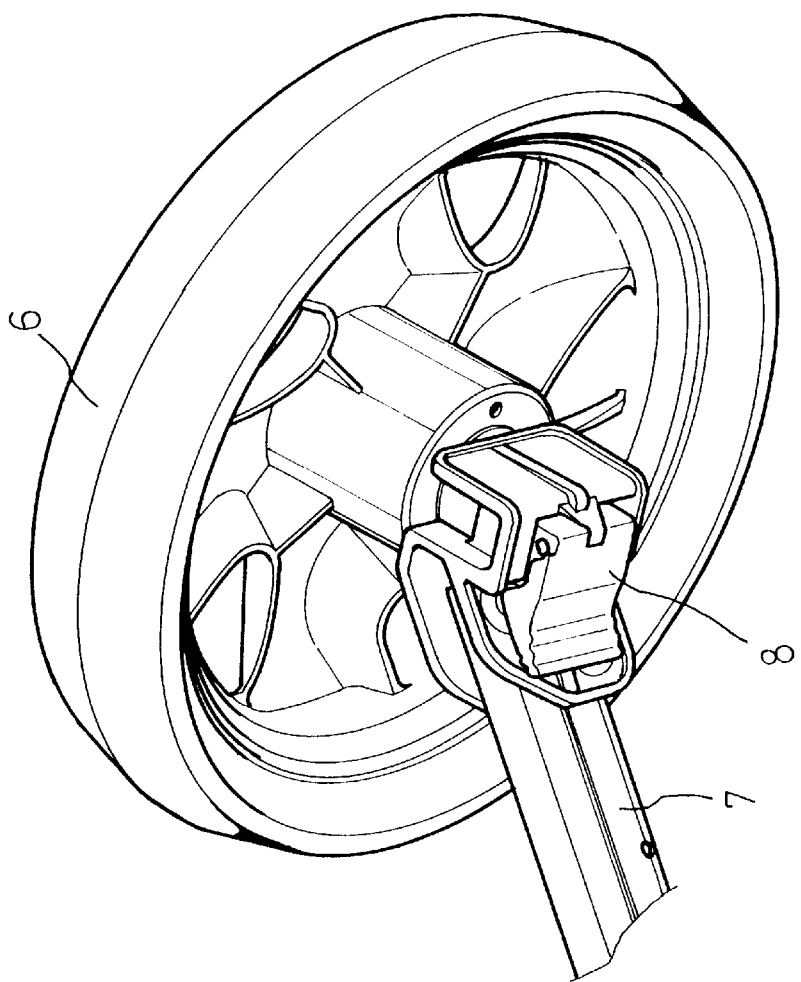
FIG. 8 is a perspective view of the wheel supporter engaged with the wheel shaft in the present invention.
Figure 9:
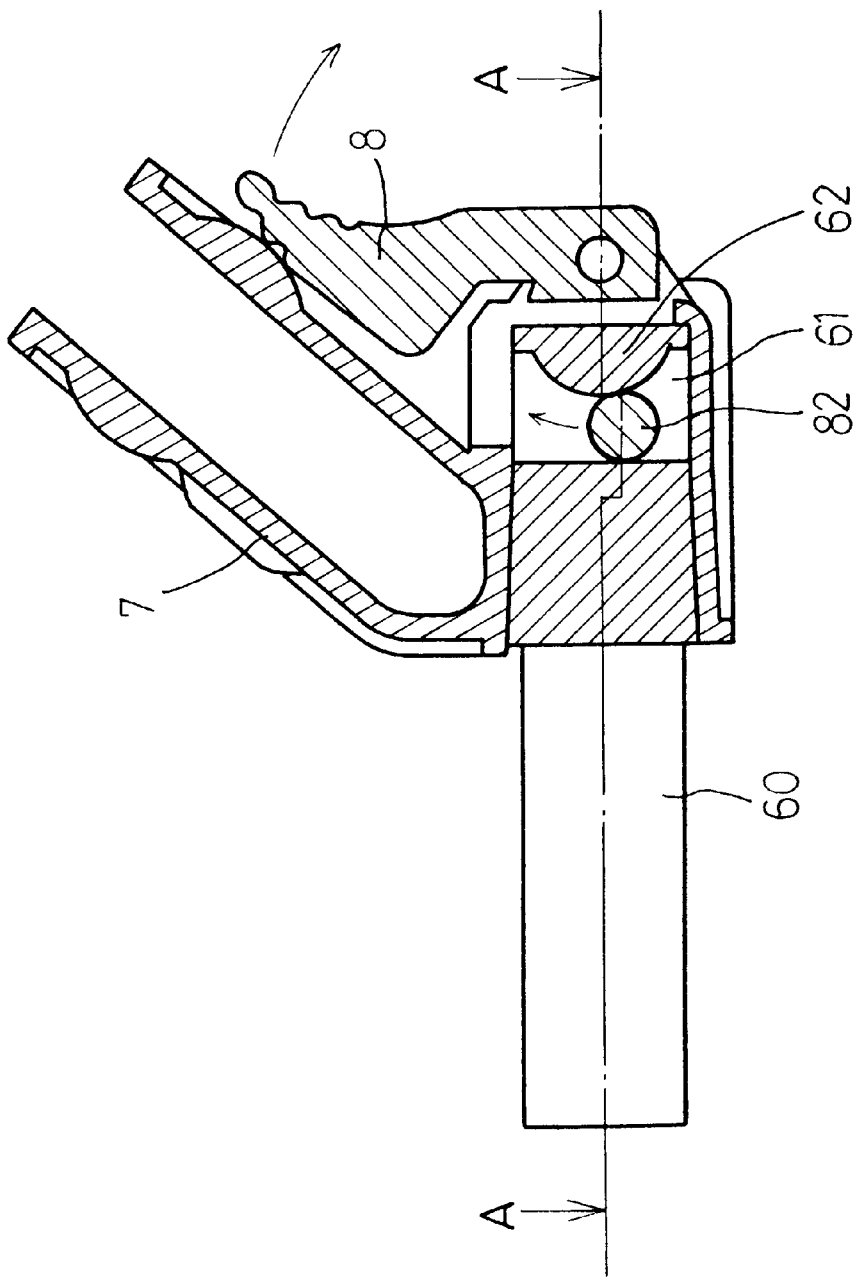
FIG. 9 is a cross-sectional view of the wheel supporter engaged with the wheel shaft in the present invention; and, FIG. 10 is a cross-sectional view of A—A line in FIG. 9.
Figure 10:
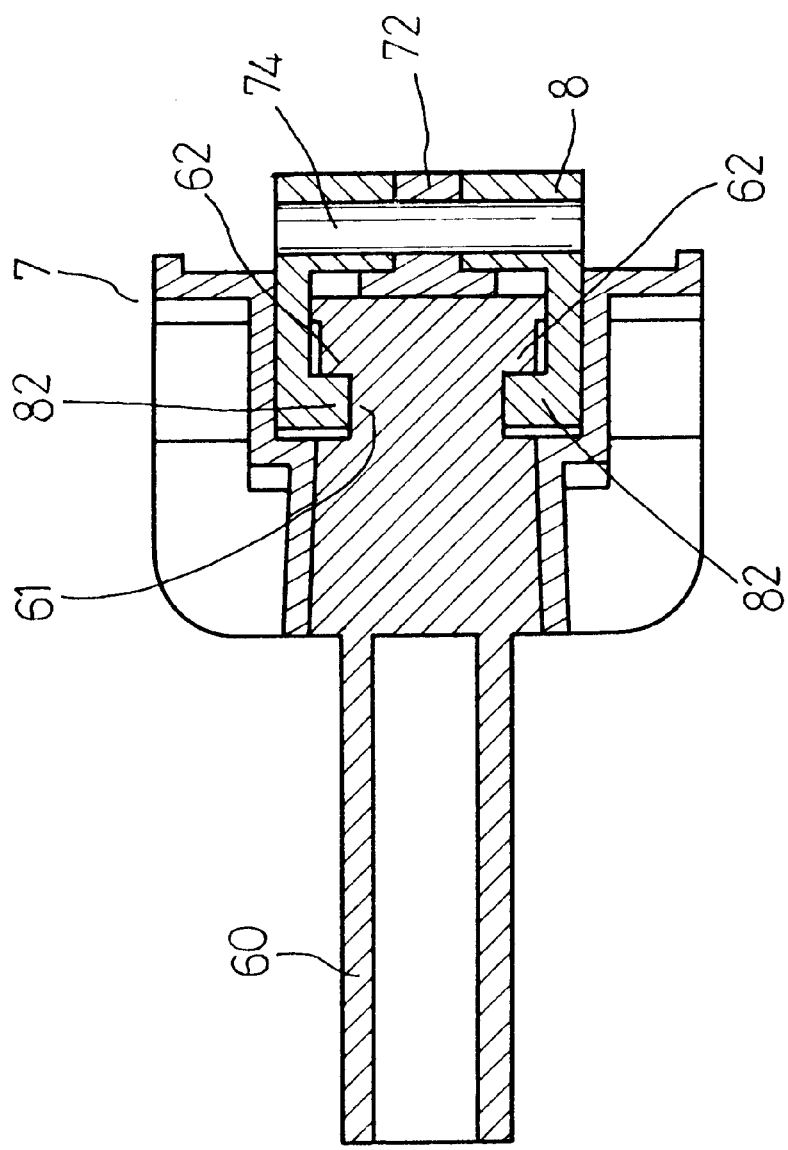

In assembling the wheel supporter 7 with the wheel shaft 10, firstly insert the wheel shaft 60 together with the wheel 6 in the shaft hole 71 of the wheel supporter 7, with the two opposite recesses just facing the grooves 73. Then pull backward the eccentric push member 8 as shown with an arrow head in FIG. 7, forcing the two round projections 82 extend in the recesses 61, slide over the curved projections 82 and engage the space between each projection 62 and the each recess 11, securing the wheel supporter 7 with the wheel shaft 60, as shown in FIGS. 8 and 9.

On the contrary, if the wheel supporter 7 is to be disengaged from the wheel shaft 60, only push swingingly down the eccentric push member 8, forcing the two round projections 82 disengage from the recesses 61 and the projections 62, with the wheel shaft 60 pulled out of the shaft hole 71, as shown in FIG. 7.

It has to be noted that the protruding end portion of the wheel shaft 60 protruding out of the wheel 6 may gradually enlarged to the rear portion in corresponding to the hole 71 also gradually enlarged to the rear portion so that the wheel shaft 60 may easily fit in the shaft hole 71, as shown in FIG. 7.

As can be understood from the aforesaid description, the wheel supporter 70 may be disengaged from the wheel shaft 60 only by pulling or pushing the eccentric push member 80, which is a very simple structure for handling.

While the preferred embodiment of the invention has been described above, it will be recognized and understood that various modifications may be made therein and the appended claims are intended to cover all such modifications which may fall within the spirit and scope of the invention.

I claim:

1. A wheel supporter and shaft for a golf cart comprising:

a wheel supporter and a wheel shaft, said wheel shaft having one end portion protruding out of a wheel, said protruding end portion is formed with two recesses therein, each said recess having a curved projection, said wheel supporter having a shaft hole to receive said wheel shaft, an eccentric push member is located under a bottom wall of said shaft hole, said eccentric push member having two round projections that protrude in said shaft hole, each said projection engages a space between a respective one of said recesses and a respective one of said curved projections so that said wheel supporter is locked with said wheel shaft.

2. The wheel supporter and shaft for a golf cart as claimed in claim 1, wherein:

said protruding end portion of said wheel shaft and said shaft hole of said wheel supporter are both rectangular in cross section.

3. The wheel supporter and shaft for a golf cart as claimed in claim 1, wherein:

said protruding end portion of said wheel shaft and said shaft hole of said wheel supporter are both tapered from an outer end to an inner end.

4. The wheel supporter and shaft for a golf cart as claimed in claim 1, wherein:

said eccentric push member has two projecting ears formed in a first end, a round projection extends outward from an inner surface of each said projecting ear, and a curved push means is formed in a second end of said eccentric push member.

* * * * *